United States Patent

[11] 3,587,759

[72] Inventor William C. Susor
Oregon, Ohio
[21] Appl. No. 792,203
[22] Filed Jan. 8, 1969
[45] Patented June 28, 1971
[73] Assignee The Reliance Electric and Engineering Company
Toledo, Ohio
Continuation of application Ser. No. 513,361, Dec. 13, 1965.

[54] ELECTRONIC COMPUTING WEIGHING SCALE WITH PRICE PER MULTIPLE POUNDS INPUT
12 Claims, 6 Drawing Figs.

[52] U.S. Cl.................................................. 177/4, 235/151.33

[51] Int. Cl........................................................ G01g 23/38
[50] Field of Search............................................ 177/3, 4, 5; 235/58, 61, 150.3, 150.31, 151.33, 164 (Inquired)

[56] References Cited
UNITED STATES PATENTS
| | | | |
|---|---|---|---|
| 3,037,563 | 6/1962 | Allen............................. | 177/4 |
| 3,181,633 | 5/1965 | Worst........................... | 235/58X |
| 3,209,998 | 10/1965 | Worst........................... | 235/61 |

Primary Examiner—Richard B. Wilkinson
Assistant Examiner—George H. Miller, Jr.
Attorney—Thomas H. Grafton ABSTRACT: An electronic computing weighing scale having a computer operable in fractional price mode, e.g., 3 pounds for $1.00, or whole number price mode, e.g., $1.00 per pound, and price entry means for the computer settable either to fractional or whole number price.

ELECTRONIC COMPUTING WEIGHING SCALE WITH PRICE PER MULTIPLE POUNDS INPUT

This is a continuation of application Ser. No. 513,361 filed Dec. 13, 1965.

invention relates to condition measuring and indication apparatus, such as systems for weighing, computing and printing a record of the weight and value of each of a plurality of successively weighed loads, and more particularly to controls for such apparatus.

The controls are particularly useful in conjunction with the weighing, computing and printing system shown and described in commonly assigned U.S. Pat. application Ser. No. 429,230, now U.S. Pat. No. 3,384,193 filed Feb. 1, 1965 in the names of W. C. Susor and O. J. Martin and in commonly assigned U.S. Pat. application Ser. No. 439,751, now U.S. Pat. No. 3,453,422 filed Mar. 15, 1965 in the name of W. C. Susor. In the system disclosed in such applications, commodities are weighed and printed tickets are issued each bearing the net weight, price per pound, and computed value of the weighed commodity together with such variable data as the date code, store or operator's code, commodity name, and commodity grade. The controls of the invention are incorporated in such system to provide fractional pricing so that, for example, a price of 3 pounds/$1.00 can be printed on the tickets and multiplied by weight, the computed value incorporating the fractional price also being printed on the tickets. "Fractional price" as used hereinafter means price per multiple pounds, such as 3 pounds for $1.00, and "whole number price" as used hereinafter means price per single pound, such as $1.12 per pound.

The objects of this invention are to provide new techniques for printing tickets, labels or the like in computing and printing weighing scale systems, to provide new controls for such systems, to improve such systems, to provide a computer for such a system in which one set of controls sets fractional price information into the system for price printing and also into the system for value computing and printing, and to provide a computer for such a system in which fractional prices, such as 2 pounds/$1.00, 3 pounds/$1.00, 4 pounds/$1.00, etc., are set into the system for price printing and for value computing and printing directly without need for using conversion tables before setting the prices into the computer.

One embodiment of this invention enabling the realization of these objects is circuitry modifying the system disclosed in the above applications; it includes price entry controls which are moved by the operator to print whole number price per pound and to compute and print value in the usual way or to print a fractional price per pound, such as 3 pounds/$1.00, and to compute and print value incorporating such fractional price in the computation.

In accordance with the above, one feature of this invention resides in entering fractional prices, such as 3 pounds/$1.00, and whole number prices, such as 59 cents a pound, through the same price entry apparatus.

Another feature resides in using existing circuitry for either fractional price or whole number price mode of operation.

Still another feature resides in entering the fractional prices directly without need for using conversion tables.

Another feature resides in multiplying a nondecimal fraction of decimal price per pound factor by weight accurately.

The above and other objects and features of this invention will be appreciated more fully from the following detailed description when read with reference to the accompanying drawings wherein.

Figure 1:
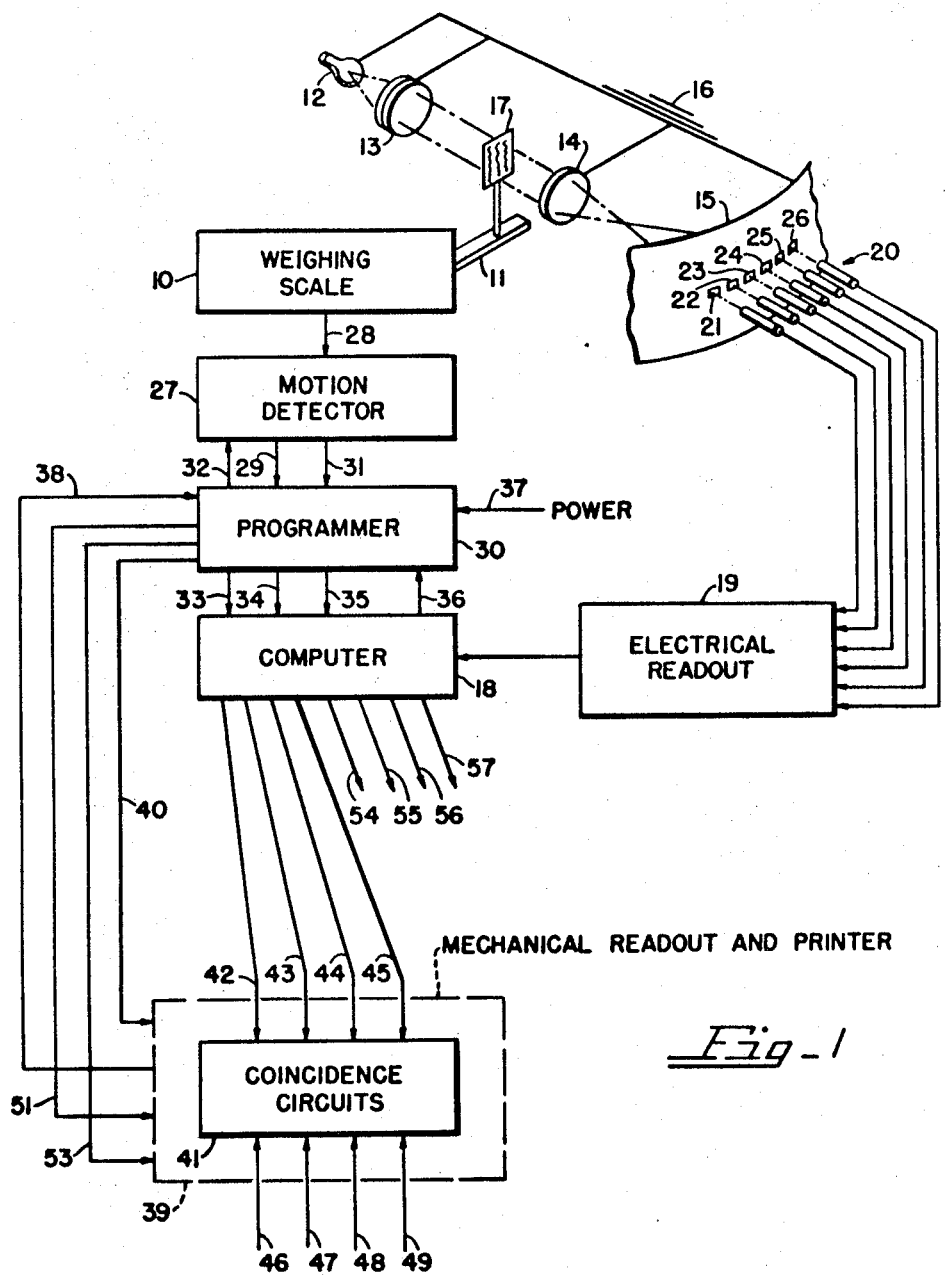
FIG. 1 is a schematic diagram illustrating the general organization of the weighing, computing and printing system.
Figure 2:
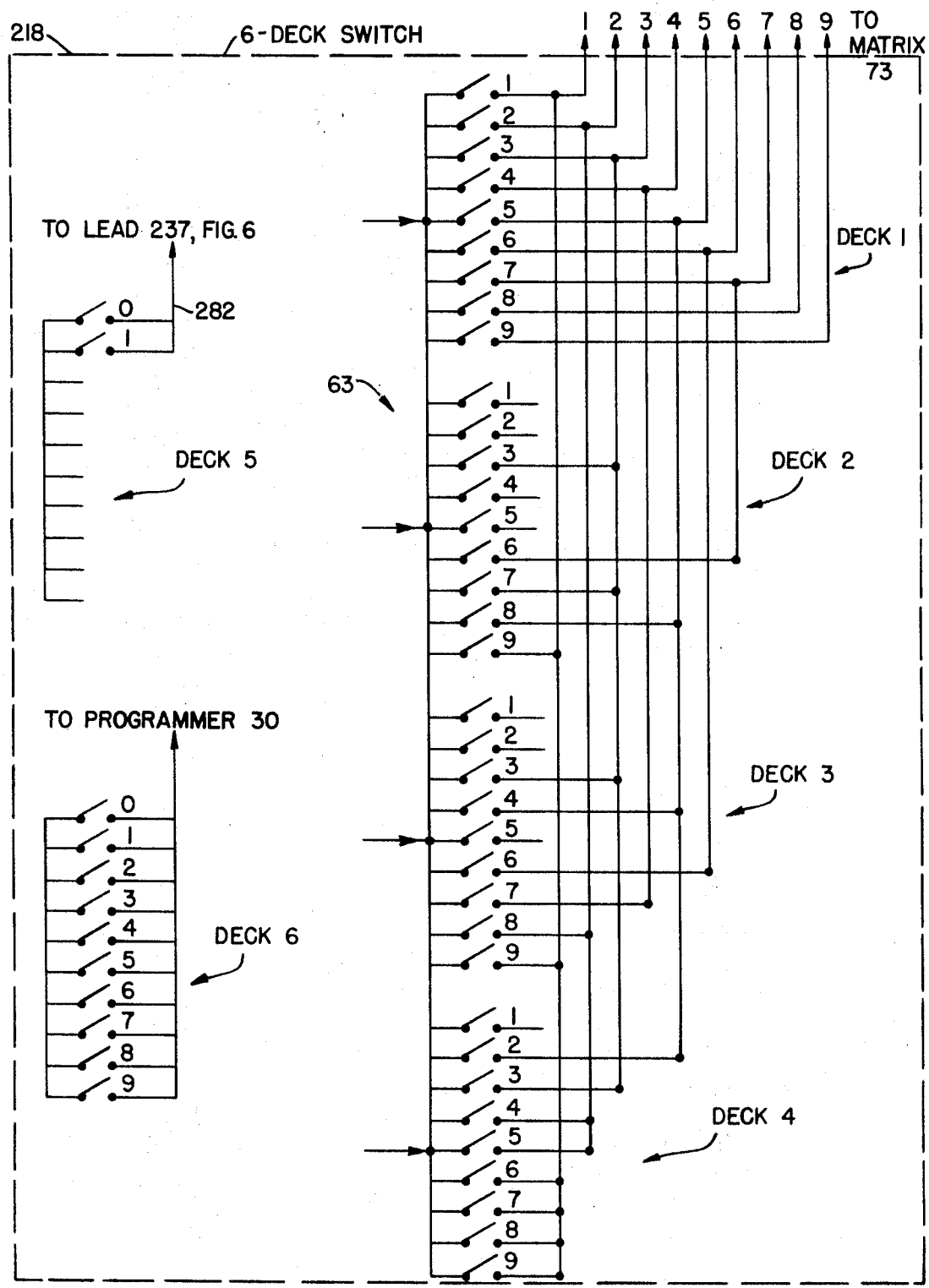
FIGS. 2, 3, 4 and 5 are detailed block diagrams of the computer shown in FIG. 1.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. A computer 18 which is disclosed in detail in the above U.S. Pat. application Ser. No. 439,751 receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1-2-4-8 binary coded decimal output of an electrical readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21—26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of 14 photocells in the photocell bank 20, only six of the 14 photocells being shown for the sake of simplicity. Fourteen photocells are enough to read out a chart capacity of 25.00 pounds.

The weighing scale 10 is connected operatively to a motion detector 27 through a connection 28, the motion detector preventing erroneous weight readouts from taking place when the weighing mechanism is in motion. The motion detector 27 applies no motion signals through a lead 29 to a programmer 30 which is disclosed in detail in the above U.S. Pat. application Ser. No. 429,230. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the readout positions of the number wheels in a mechanical readout and printer 39 agree. The programmer 30 also applies a signal through a lead 40 to the mechanical readout and printer 39 commanding it to print.

As described in the above U.S. Pat. application Ser. No. 429,230, the programmer 30 is used in conjunction with a mechanical readout which is disclosed in commonly assigned U.S. Pat. application Ser. No. 416,526, now U.S. Pat. No. 3,416,151, filed Dec. 7, 1964, in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1-2-4-8 binary coded unit price signals from the computer 18 through leads 42—45 and 1-2-4-8 binary coded decimal signals through leads 46—49 indicative of the positions of the commutators. The detent wheels and thus the print wheels are stopped when the coincidence circuits determine that the wheels are in the correct indicating positions. The readout also includes a solenoid coil which when it receives a signal through a lead 51 permits a new reading to be made and a second solenoid coil which when it receives a signal through a lead 53 unlocks the unit price indicating modules. Similarly, the coincidence circuits 41 receive 1-2-4-8 binary coded decimal computed value signals from the computer 18 through leads 54—57 and 1-2-a'-8 binary coded decimal weight signals from the electrical readout 19 through leads 233, and 1-2-4-8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip-flop or bistable circuit has ON and OFF or reset input terminals, and ON and OFF output terminals. The MEMORY or bistable circuit produces an ON output signal in response to a signal applied at the ON input terminal and continues to produce the ON output signal, even though the input signal at the ON input terminal is removed, until a signal is applied to the OFF input terminal. The MEMORY circuit will then be turned OFF and produce an OFF output signal even though the signal at the OFF input terminal is removed. The MEMORY circuit will revert to its initial state upon application of a signal to the ON input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter, such as gates and flip-flops, and the clock and diode matrix circuits are of conventional type. The connections between said circuits are clearly shown in the drawings and will not be described in detail.

The computer 18 is shown in detailed block form in FIGS. 2—5, the figures being connected together at the lead ends as indicated and in generally the same manner as shown in the above U.S. Pat. application Ser. No. 439,751. The computer 18 basically is the same as disclosed in such application except it has been modified for the entry either of fractional or whole number prices in accordance with the invention.

The computer 18 includes a synchronized free running multivibrator or clock 58, which is gated on by a reset signal from the programmer 30 through the lead 33, a conventional 1-2-4-8 binary counter 59, a conventional 1-2-4-8 binary coded decimal counter 60, and two two-stage flip-flops 61 and 62 (bistable means), the counters 59 and 60, the two-stage flip-flops 61 and 62, and a register 72 being reset at the start of a cycle by the same reset signal from the programmer 30 through the lead 33 which gates on the clock 58. Price entry is made in a price circuit 63 (first factor entering means, FIGS. 2 and 3) by moving price knobs or levers and weight entry is made in a weight circuit 64 (second factor entering means) as described above, i.e., the parallel 1-2-4-8 binary coded decimal output of the electrical readout 19 (FIG. 1).

Figure 4:
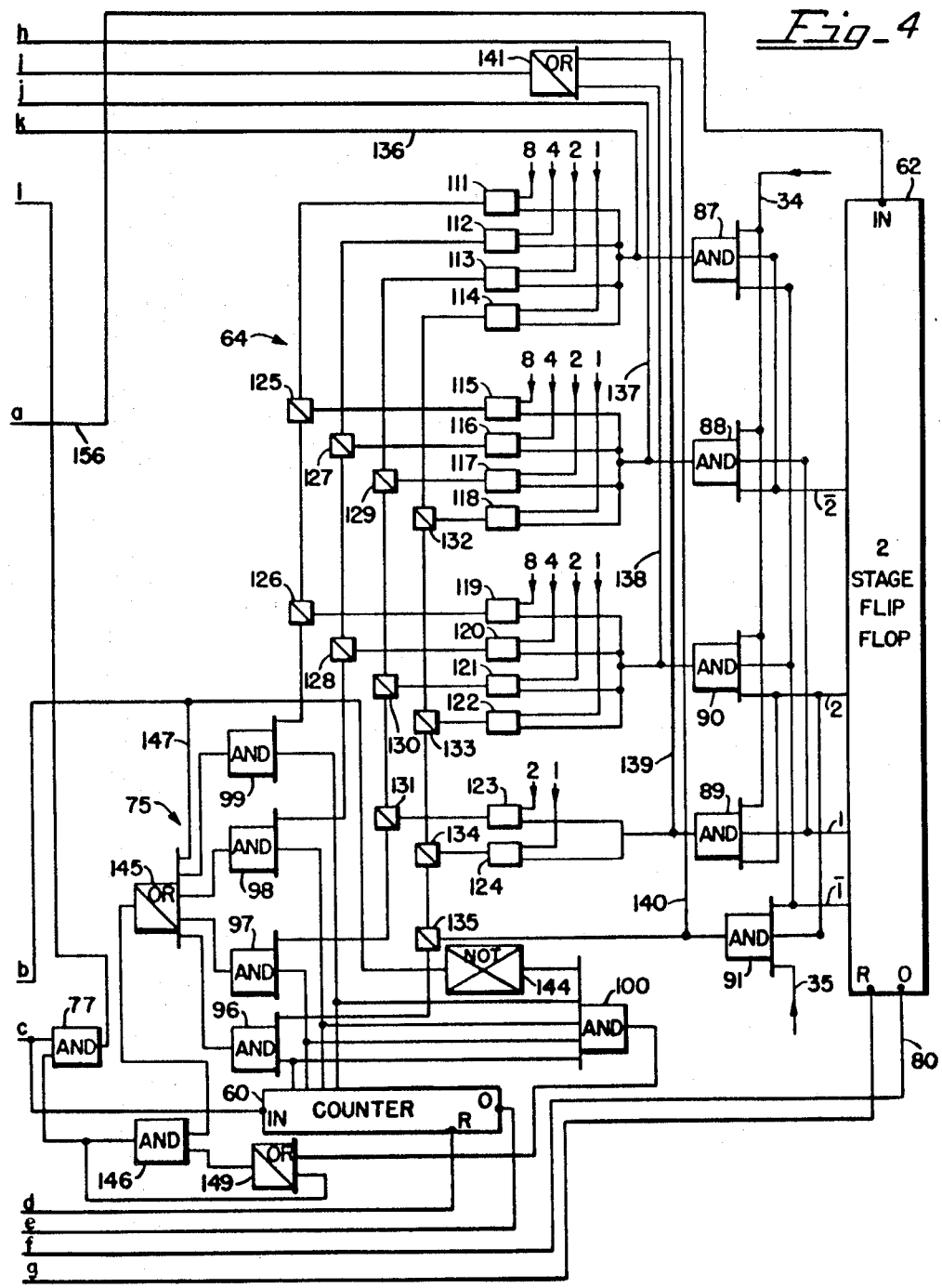

The two two-stage flip-flops 61 and 62 each is identical to the two-stage flip-flop shown in detail in FIG. 4 of the above U.S. Pat. application Ser. No. 429,230. The counters 59 and 60 each contain two of such two-stage flip-flops, i.e., each of the two-stage flip-flops 61 and 62 may be considered as half of a conventional 1-2-4-8 binary coded decimal counter which counts to three by the following code:

| 1 | 2 | 4 | 8 | Count | Binary output |
|---|---|---|---|-------|---------------|
| 0 | 0 | 0 | 0 | 0 | $\bar{1}$ $\bar{2}$ (not 1, not 2). |
| 1 | 0 | 0 | 0 | 1 | 1 $\bar{2}$ (true 1, not 2). |
| 0 | 1 | 0 | 0 | 2 | $\bar{1}$ 2 (not 1, true 2). |
| 1 | 1 | 0 | 0 | 3 | 1 2 (true 1, true 2). |

The weighing scale 10 (FIG. 1) has a capacity of 25.00 pounds. The price entry circuit 63 has a capacity of $9.99 when in whole number price mode and 2/$9.99, 3/$9.99, ..., and 9/$9.99 when in fractional price mode. When in whole number price mode, the least significant place in the selected price per pound is multiplied by each place in the weight figure using the least significant place first, etc., with pulse entry of the partial products made into the register 72 which by partial product accumulation produces the final computed value figure. Then the procedure is repeated by multiplying the next place in the price per pound by each place in the weight figure and repeated again using the last place in the price per pound. The decimal price entry is changed to 1-2-4-8 binary coded decimal by a conventional encoder or diode matrix 73, e.g., a decimal nine in produces a 1-8 binary output, and is applied to a coincidence circuit 74. The parallel 1-2-a'-8 binary coded decimal weight output of the electrical readout 19 is applied to a coincidence circuit 75. At the start, with the clock 58 gated on and the counters 59 and 60 and the two-stage flip-flops 61 and 62 reset, price entry upsets coincidence between the price entry and the count in the counter 59 as detected by the coincidence circuit 74 and weight entry upsets coincidence between the weight entry and the count in the counter 60 as detected by the coincidence circuit 75. In the whole number price mode, the two-stage flip-flop 61 in its reset state selects the cents place in the selected price per pound to be multiplied first and the two-stage flip-flop 62 in its reset state selects the hundredths place in the weight figure to be multiplied first.

The clock 58 has a gate terminal G to which the reset signal from the programmer 30 is applied through the lead 33 to gate on the clock and two output terminals 81 and 82. The clock 58 always starts negative putting such negative pulse on the terminal 81 while putting the positive portion of the pulse on the terminal 82. The two-stage flip-flop 61, which is identical to the one shown in FIG. 4 of the above U.S. Pat. application Ser. No. 429,230, has four output leads identified by the numbers 1, 2, $\bar{1}$ and $\bar{2}$ just as are the four output leads shown in such FIG. 4 to produce binary outputs in accordance with the code set forth in the above table. At count zero, $\bar{1}$ and $\bar{2}$ outputs enable an AND gate 83; at count one, 1 and $\bar{2}$ outputs enable an AND gate 84; at count two, $\bar{1}$ and 2 outputs enable an AND gate 85; and at count three, 1 and 2 outputs partially enable an AND gate 201. The two-stage flip-flop 61 also has output, in and reset terminals O, IN and R, respectively. The two-stage flip-flop 62 also has four output leads identified by the numbers $\bar{2}$, 2, 1, and $\bar{1}$. At count zero, $\bar{1}$ and $\bar{2}$ outputs partially enable an AND gate 87; at count one, 1 and $\bar{2}$ outputs partially enable an AND gate 88; at count two, $\bar{1}$ and 2 outputs partially enable two AND gates 90 and 91; and at count three, 1 and 2 outputs partially enable AND gate 89. The two-stage flip-flop 62 also has output, in and reset terminals O, IN and R, respectively. The 1-2-4-8 binary counter 59 has in and reset terminals IN and R, respectively. In the reset condition, the four output leads of the counter 59 apply four outputs to AND gates 92—95, respectively, to partially enable such gates. The 1-2-a'-8 binary coded decimal counter 60 has in, reset and output terminals IN, R and O, respectively. In the reset condition, the four output leads of the counter 60 apply four outputs to AND gates 96—99, respectively, to partially enable such gates. At the same time, all outputs from the counter 60 are applied to an AND gate 100 to partially enable it.

Price entry is made in the price circuit 63 (FIGS. 2 and 3) which includes a bank of 10 cents contacts 101 (only nine shown), a bank of 10 dimes contacts 102 (only nine shown), and a bank of 10 dollars contacts 103 (only nine shown) which are closed by setting the price knobs or levers to selected positions. Fractional price entry also is made in the price circuit 63 by means described below after the basic computing circuit has been described. The contacts 101—103 are in circuit with the respective ones of terminals 1—9 in the diode matrix 73. The AND gate 83 when enabled by the two-stage flip-flop 61 being in its reset state applies an output to a lead 104 (controls partial product gating hereinafter described) and to the bank of cents contacts 101; and AND gate 84 when enabled by the two-stage flip-flop 61 being in its count one state applies an output to a lead 105 (controls partial product gating) and to the bank of dimes contacts 102; and the AND gate 85 when enabled by the two-stage flip-flop 61 being in its count two state applies an output to a lead 106 (controls partial product gating) and to the bank of dollars contacts 103. The leads 104—106 are connected to the partial product gating shown in FIG. 5.

The decimal price entry, e.g., a price of $1.12, would connect a closed contact in the bank 101 to the 2 terminal of the diode matrix 73, a closed contact in the bank 102 to the 1 terminal of the diode matrix 73, and a closed contact in the bank 103 to the 1 terminal of the diode matrix 73, is changed to 1-2-a'-8 binary coded decimal by the diode matrix 73. It is to be remembered that only one bank of contacts is energized at a time as programmed by the two-stage flip-flop 61. When price contacts are closed, output terminals 1, 2, 4, and 8 of the diode matrix 73 apply inputs to the respective AND gates 92—95. For example, a decimal nine in produces a 1-8 binary output on output terminals 1 and 8 which is applied to AND gates 92 and 95.

Weight entry is made in the weight circuit 64 which includes four AND gates 111—114 which receive the hundredths place parallel 1-2-4-8 binary coded decimal output of the electrical readout 19 (FIG. 1), four AND gates 115—118 which receive the tenths place parallel 1-2-4-8 binary coded decimal weight output, four AND gates 119—122 which receive the units place weight output, and two AND gates 123—124 which receive the tens place weight output (25.00 pounds weighing scale capacity). The outputs of AND gates 111 and 115 are applied through OR gates 125 and 126 to the AND gate 99 and the output of the AND gate 119 is applied through OR gate 126 to the AND gate 99. The outputs of AND gates 112 and 116 are applied through OR gates 127 and 128 to the AND gate 98 and the output of the AnD gate 120 is applied through the OR gate 128 to the AND gate 98. The outputs of AND gates 113 and 117 are applied through OR gates 129—131 to the AND gate 97, the outputs of AND gate 121 is applied through the OR gates 130 and 131 to the AND gate 97, and the output of the AND gate 123 is applied through the OR gate 131 to the AND gate 97. The output of the AND gates 114 and 118 are applied through OR gates 132—135 to the AND gate 96, the output of AND gate 122 is applied through the OR gates 133—135 to the AND gate 96, the output of AND gate 124 is applied through OR gates 134 and 135 to the AND gate 96, and the output of the AND gate 91 is applied through the OR gate 135 to the AND gate 96. The function of the AND circuit 91 is not to make weight entry but to make entry of a factor of one which is multiplied by the price entry for the purpose of storing price information in the register 72. The output of AND gate 87 partially enables AND gates 111—114, the output of AND gate 88 partially enables AND gates 115—118, the output of AND gate 90 partially enables AND gates 119—122, and the output of AND gate 89 partially enables AND gates 123 and 124. AND gates 87, 88, 90, 89 and 91 also apply their outputs to leads 136—140, respectively, which are connected to the partial product gating (FIG. 5) hereinafter described. Leads 138 and 140 are in circuit with the input of an OR gate 141.

At the start of a cycle the clock 58 is gated on and the counters 59 and 60, the two-stage flip-flops 61 and 62, and the register 72 are reset by the reset signal from the programmer 30 through the lead 33. At the count zero, the 1 and 2 outputs of the reset flip-flop 61 enable the AND gate 83 as described above to select the cents place in the price per pound to be multiplied first. Price entry is made as described above producing the 1-2-4-8 binary coded decimal output from the diode matrix 73. The coincidence circuit 74 includes the AND gates 92—95 and an OR gate 142. At count zero, the reset counter 59 has four outputs which partially enable the four AND gates 92—95. Price entry completely enables the respective ones of the AND gates 92—95 as described above and the outputs of the enabled AND gates 92—95 are applied to the OR gate 142 which in turn delivers an input to the AND gate 76. When this output from the OR gate 142 ceases, the change in state is used as an input to an AND gate 143. Price entry upsets coincidence between the price entry and the count in the counter 59 as detected by the coincidence circuit and clock pulses are passed by the AND gate 76 as long as coincidence does not exist, the AND gate 76 being enabled by the outputs of the OR gate 142 and the clock 58. As described above, decimal price entry in each 1—9 place in the price figure is made by closing selected ones of the contacts 101—103. No contacts are needed in multiplying price times weight for the 0 places in the price figure because coincidence already exists between the AND gates 92—95 and the count in the counter 59 (condition of circuit as shown with all of the contacts 101—103 open) when a 0 is selected to in effect multiply the weight entry by zero putting no pulses in the register 72 as the computer steps through its cycle.

Figure 5:
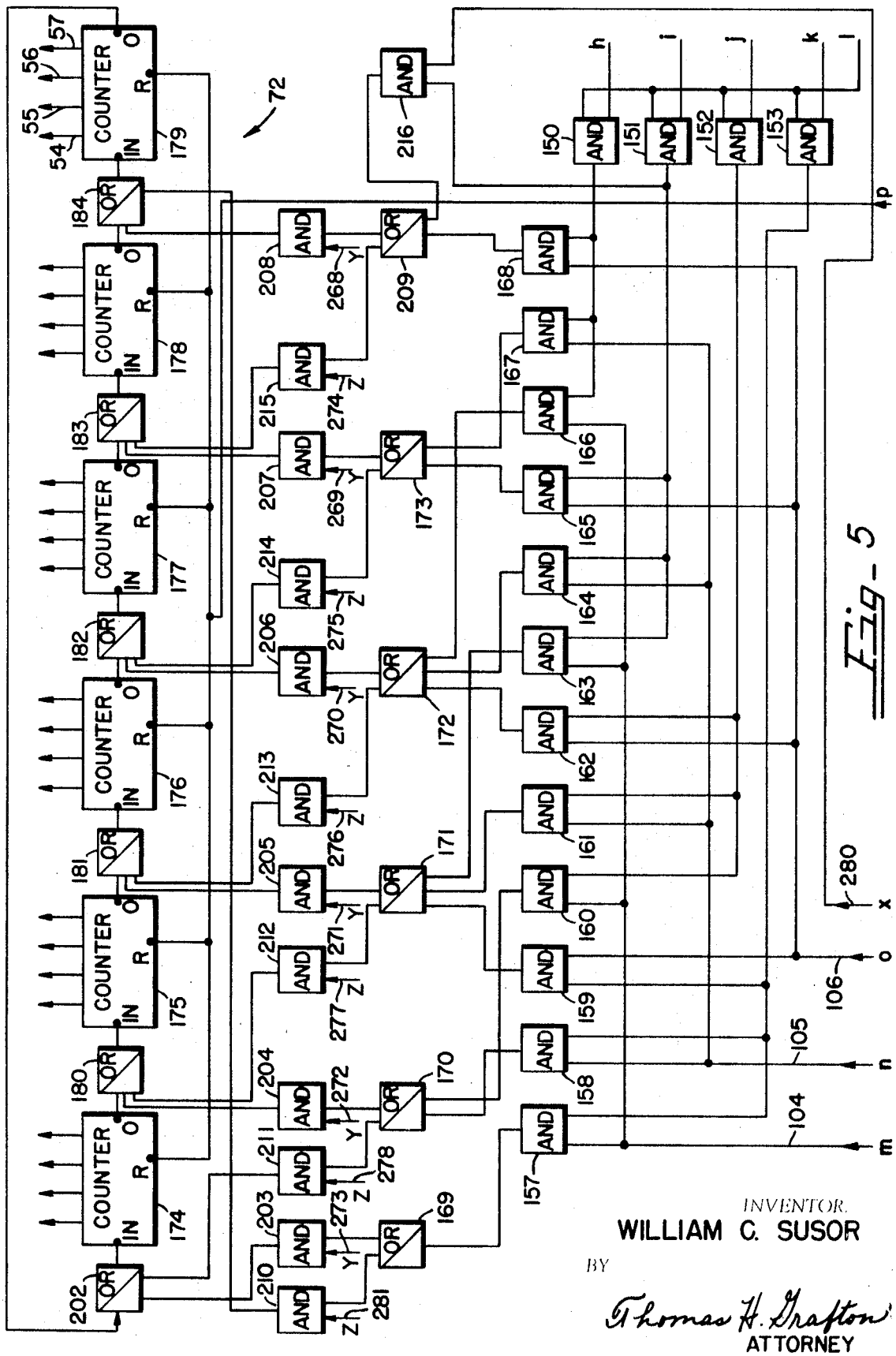

At count zero, the 1 and 2 outputs of the reset two-stage flip-flop 62 partially enable the AND gate 87 which is completely enabled by a command to multiply weight times price on the lead 34 from the programmer 30. However, before this happens a command from the programmer 30 to multiply one times price is applied to the computer from the lead 35. Since multiplying one times price is done in the same manner as multiplying weight times price, for the sake of simplicity, the process will not be described except to note that at the beginning of the cycle when one is to be multiplied by price the two-stage flip-flop 62 is in its count zero stage partially enabling the AND gate 87 which is not completely enabled because there is no input from the programmer 30 on the lead 34 resulting in zero being multiplied by price, then the two-stage flip-flop 62 is advanced to its count one state with the same result, then the two-stage flip-flop 62 is advanced to its count two state resulting in partial enabling of AND gates 90 and 91 with the same result as to AND gate 90, and then the two-stage flip-flop 62 is advanced to its count three state with the same result. The partially enabled AND gate 91 is completely enabled by the command to multiply one times price on the lead 35 and the output of the enabled AND gate 91 is applied to the lead 140 (controlling partial product gating hereinafter described) and to the OR gate 135 which applies an input to the AND gate 96, whereupon one is multiplied times price as hereinafter described in connection with a description of multiplying weight times price. The unit price figure is stored in the register 72 in the same manner as the computed valve figure is stored in the register. The register 72 contains one series of counter stages for storing the unit price figure and another for storing the computed value figure. For the sake of simplicity, only one series of counter stages is shown in FIG. 5. However, as shown in FIG. 1, leads 42—45 extend from the price counter stages and leads 54—57 extend from the computed value counter stages. As above described, the readout 39 (FIG. 1) includes coincidence circuits 41 which receive 1-2-4-8 binary coded unit price signals from the computer 18 through leads 42—45, i.e., from one series of counter stages, and 1-2-4-8 binary coded decimal value signals through leads 54—47, i.e., from the other respective series of counter stages.

After the selected price figure has been stored in the register 72, the price entry is multiplied again but this time by the weight entry to obtain the computed value. First, the clock 58 is gated on and the counters 59 and 60, the two-stage flip-flops 61 and 62, and the register 72 are reset by the reset signal from the programmer 30 through the lead 33 and later the computer 18 receives the command to multiply weight times price on the lead 34 from the programmer 30 partially enabling AND gates 87, 88, 89 and 90. At count zero, the 1 and 2 outputs of the reset two-stage flip-flop 62 completely enable the partially enabled AND gate 87. The enabled AND gate 87 applies its output to the lead 136 (controlling partial product gating hereinafter described) and to the inputs of AND gates 111—114 to select the hundredths place in the weight figure to be multiplied first. As above described, the hundredths place parallel 1-2-4-8 binary coded decimal output of the electrical readout 19 (FIG. 1), i.e., the weight entry, completely enables the respective ones of the AND gates 111—114 to in turn cause the respective AND gates 96—99 to be enabled, the four outputs from the reset counter 60 having already partially enabled such AND gates 96—99. The coincidence circuit 75 includes the AND gates 96—100 a NOT gate 144, and an OR gate 145. Weight entry completely enables the respective ones of the AND gates 96—99 as described above and the outputs of the enabled AND gates 96—99 are applied to the OR gate 145 which in turn delivers an input to an AND gate 146 partially enabling it. No weight entry for the 0 places in the weight figure is needed because coincidence already exists between the AND gates 96—99 and the count in the counter 60 before a weight entry is made to in effect multiply the price entry by zero putting no pulses in the register 72 as the computer steps through its cycle.

The negative pulse from the clock 58 also is applied to the NOT gate 144 which inverts the signal and applies it to the AND gate 100 which already is partially enabled by the four outputs of the reset counter 60 and the pulse from the clock 58 when it goes positive enables the OR gate 145 by way of a lead 147 if the OR gate 145 is not enabled already. The enabled AND gate 100 applies its output to an OR gate 149 having its output connected to the AND gate 146. The output of the AND gate 76 is connected to an input of the AND gate 77, the output of the AND gate 77 being connected to inputs of AND gates 150—153 of the partial product gating. The output of the AND gate 76 also is connected to the IN terminal of the counter 60.

The AND gate 146 which is enabled by inputs from the OR gates 145 and 149 enables the partially enabled AND gate 77 which passes clock pulses to be counted by the register 72 and the AND gate 76 applies pulses to be counted to the counter 60. Accordingly, as long as the coincidence circuit detects a condition of no coincidence between the weight entry and the count in the counter 60 pulses pass to the register 72 and to the counter 60. That is, weight entry upsets coincidence. When the count in the counter 60 reaches a state where the 1-2-a'-8 coded output of the counter agrees with the 1-2-4-8 weight code set up on the AND gates 96—99, the respective counter outputs to the enabled ones of the AND gates 96—99 are cut off and such AND gates 96—99 are disabled and no outputs are applied by such AND gates 96—99 to the OR gate 145 (coincidence). As soon as the next clock pulse starts going negative, this signal is applied to the OR gate 145 through the lead 147 to disable it which in turn causes the AND gate 146 to be disabled. This in turn causes the AND gate 77 connected to the disabled AND gate 146 to close cutting off pulses to the register 72. However, pulses still flow from the AND gate 76 to the counter 60 which resets on the tenth pulse and applies such tenth pulse to the IN terminal of the counter 59 to advance it.

The OR gate 149 is a holding circuit which keeps the AND gate 146 on until it loses its input from the OR gate 145 because the output of the AND gate 146 is applied to the OR gate 149 which has its output in turn connected to the input of the AND gate 146. The counter 60 counts as soon as it receives a pulse that is starting to go positive. The OR gate 145 drops out as far as it is enabled by the positive pulse from the clock 58 on lead 147 as soon as the pulse starts going negative. This delay after coincidence between the count in the counter 60 and the weight entry set up on the AND gates 96—99 has been attained ensures full pulse count by not closing the AND gate 77, which is connected to the OR gate 145 through the AND gate 146, until it is certain that the register 72 has received the last pulse to be counted. This prevents a clock pulse from being cut short by the AND gate 77 when it is disabled. When the counter 60 is reset (resets and applies four outputs to the AND gate 100 as soon as it receives the tenth positive pulse), the AND circuit 100 is disabled by a negative input signal applied to it by the NOT gate 144. This ensures that the tenth pulse is not counted by the register 72.

Reset of the counter 60 upsets coincidence between its count and the weight entry and the process is repeated until the counter 59 is advanced to a point where its 1-2-4-8 coded output agrees with the 1-2-4-8 code set up on the AND gates 92—95. The respective counter outputs to the enabled ones of the AND gates 92—95 are cut off and such AND gates 92—95 are disabled and no outputs are applied by such AND gates 92—95 to the OR gate 142 (coincidence). This means that, if the cents place in the price entry was a two and the hundredths place in the weight entry was a four, eight pulses have been counted by the register 72, i.e., a partial product.

When coincidence circuit 74 (AND gates 92—95 and counter 59) detects coincidence, the output from the OR gate 142 changes sign and this input is applied to the AND gate 143 which already is enabled by the output from the clock 58. The enabled AND gate 143 enables an OR gate 155 and applies an advance signal on a lead 156 connected to the IN terminal of the two-stage flip-flop 62 to advance it to its count one state. An input of the OR gate 155 also is connected to the lead 33 on which reset signals are applied from the programmer 30. The enabled OR gate 155 resets both counters 59 and 60 by applying reset signals to terminals R of such counters. The two-stage flip-flop 62 in its count one state selects the tenths place in the weight figure to be multiplied next (1 and $\bar{2}$ outputs together with the command to compute signal on the lead 34 enable the AND gate 88). The cents place in the price entry now is multiplied by the tenths place in the weight figure as described above with pulse entry of the partial product in the register 72 which accumulates the partial products, and another output from the AND gate 143 resets the counters 59 and 60 and advances the two-stage flip-flop 62 to its count two state.

The two-stage flip-flop 62 in its count two state selects the units place in the weight figure to be multiplied next ($\bar{1}$ and 2 outputs together with the command to compute signal on the lead 34 enable the AND gate 90). The cents place in the price entry now is multiplied by the units place in the weight figure as described above with pulse entry of the partial product in the register 72 and another output from the AND gate 143 resets the counters 59 and 60 and advances the two-stage flip-flop 62 to its count three state.

The two-stage flip-flop 62 in its count three state selects the tenths place in the weight figure to be multiplied next (1 and 2 outputs together with the command to compute signal on the lead 34 enable the AND gate 89). The cents place in the price entry now is multiplied by the tenths place in the weight figure as described above with pulse entry of the partial product into the register 72 and another output from the AND gate 143 resets the counters 59 and 60 and resets the two-stage flip-flop 62 to its count zero state which as it resets applies a pulse on the lead 80 to advance the two-stage flip-flop 61 to its count one state.

The two-stage flip-flop 61 in its count one state (1 and $\bar{2}$ outputs enable the AND gate 84) selects the dimes place in the price entry to be multiplied next. The above process is repeated until every place in the weight figure is multiplied by the dimes place in the price entry whereupon two-stage flip-flop 62 resets and applies a pulse on the lead 80 to advance the two-stage flip-flop 61 to its count two state.

The two-stage flip-flop 61 in its count two state ($\bar{1}$ and 2 output enable the AND gate 85) selects the dollars place in the price entry to be multiplied next. The above process is repeated until every place in the weight figure is multiplied by the dollars place in the price entry, whereupon two-stage flip-flop 62 resets and applies a pulse on the lead 80 to advance the two-stage flip-flop 61 which then applies an output on the lead 36 to advance the programmer 30. The computed value now is stored in register 72.

As described above, the leads 104—106 are connected to partial product gating shown in FIG. 5 which includes 12 AND gates 157—168. The partial product gating also includes the AND gates 150—153 each of which have an input connected to the output of the AND gate 77. The other input of the AND gate 150 is connected to the lead 139; the other input of the AND gate 151 is connected to the output of the OR gate 141, the inputs of the OR gate 141 being connected to the leads 138 and 140; the other input of the AND gate 152 is connected to the lead 137; and the other input of the AND gate 153 is connected to the lead 136. The inputs of the AND gate 157 are connected to the lead 104 and to the output of the AND gate 153, respectively; the inputs of the AND gate 158 are connected to the lead 105 and to the output of the AND gate 153, respectively; the inputs of the AND gate 159 are connected to the output of the AND gate 153 and to the lead 106, respectively; the inputs of the AND gate 160 are connected to the lead 104 and to the output of the AND gate 152, respectively; the inputs of the AND gate 161 are connected to the lead 105 and to the output of the AND gate 152, respectively; the inputs of the AND gate 162 are connected to the lead 106 and to the output of the AND gate 152, respectively; the inputs of the AND gate 163 are connected to the lead 104 and to the output of the AND gate 151, respectively; the inputs of the AND gate 164 are connected to the lead 105 and to the output of the AND gate 151, respectively; the inputs of the AND gate 165 are connected to the output of the AND gate 151 and to the lead 106, respectively; the inputs of the AND gate 166 are connected to the lead 104 and to the output of the AND gate 150, respectively; the inputs of the AND gate 167 are connected to the lead 105 and to the output of the AND gate 150, respectively; and the inputs of the AND gate 168 are connected to the lead 106 and to the output of the AND gate 150, respectively.

The output of AND gate 157 is connected to the input of an OR gate 169; the output of AND gate 158 is connected to the input of an OR gate 170; the output of AND gate 159 is connected to the input of an OR gate 171; the output of the AND gate 160 is connected to the input of the OR gate 170; the output of the AND gate 161 is connected to an input of the OR gate 171; the output of the AND gate 162 is connected to an input of an OR gate 172; the output of the AND gate 163 is connected to an input of the OR gate 171; the output of the AND gate 164 is connected to an input of the OR gate 172; the output of the AND gate 165 is connected to an input of an OR gate 173; the output of the AND gate 166 is connected to an input of the OR gate 172; and the output of the AND gate 167 is connected to an input of the OR gate 173.

The register 72 includes a series of counter stages that by partial product accumulation produces the final computed value figure. The register 72 includes six binary coded decimal counters 174—179 each like the counter 60 (FIG. 4). Each of the counters 174—179 includes input, reset and output terminals IN, R and O, respectively. The reset terminals R of the counters 174—179 are connected to the programmer reset lead 33. The IN terminal of the counter 174 is connected to the output of the OR gate 169 through an OR gate 202 and an AND gate 203 and the output terminal of the counter 174 is connected to an input of an OR gate 180, a second input of the OR gate 180 being connected to the output of the OR gate 170 through an AND gate 204. The input of the counter 175 is connected to the output of the OR gate 180 and the output of the counter 175 is connected to an input of an OR gate 181, a second input of the OR gate 181 being connected to the output of OR gate 171 through an AND gate 205. The input of the counter 176 is connected to the output of the OR gate 181 and the output of the counter 176 is connected to an input of an OR gate 182, a second input of the OR gate 182 being connected to the output of the OR gate 172 through an AND gate 206. The input of the counter 177 is connected to the output of the OR gate 182 and the output of the counter 177 is connected to an input of an OR gate 183, a second input of the OR gate 183 being connected to the output of the OR gate 173 through an AND gate 207. The input of counter 178 is connected to the output of the OR gate 183 and the output of the counter 178 is connected to an input of an OR gate 184, a second input of the OR gate 184 being connected to the output of the AND gate 168 through an AND gate 208 and an OR gate 209. The input of counter 179 is connected to the output of the OR gate 184 and the output of counter 179 is connected to the input of counter 174 through the OR gate 202. The output of the OR gate 169 when the AND gate 203 is enabled by means hereinafter described fills the counter 174 until the tenth pulse spills over to the counter 175 through the OR gate 180, the output of the OR gate 170 when the AND gate 204 is enabled also helping to fill the counter 175 through the OR gate 180. In a similar manner, counters 176—179 are each filled from two sources. An AND gate 210 is located between the OR gate 169 and the OR gate 184; an AND gate 211 is located between the OR gate 170 and the OR gate 202; and AND gate 212 is located between the OR gate 171 and the OR gate 180; and AND gate 213 is located between the OR gate 172 and the OR gate 181; an AND gate 214 is located between the OR gate 173 and the OR gate 182; and an AND gate 215 is located between the OR gate 209 and the OR gate 183. An AND gate 216 has its inputs connected to the output of the AND gate 151 and to a lead 280 and has its output connected to an input of the OR gate 209.

Counters 174—179 accumulate the 0.0001, 0.001, 0.01, 0.1, 1.0 and 10.0 decimal places in the computed value, respectively. Counters 174 and 175 are not used in indicating the end result and thus the total computed value capacity is $99.99. That is, 0.0001+0.001+0.01++1.0+10.0 equals 11.1111. When the last two places are dropped, four places in the figure remain. Counter 175 could be preset with five counts in order to round off to the next higher cent. Counters 176—179 each puts a 1-2-4-8 binary coded decimal output on its four output leads one set of which is numbered 54—57 in FIG. 5 (Counter 179) and shown as the four leads 54—57 in FIG. 1. As above described, there are a commutator and a print wheel for each set of four output leads in the mechanical readout and printer 39 which are set up in accordance with the computed value count accumulated in the register 72. As also described above, there are a commutator and a print wheel for each set of four output leads 42—45 (FIG. 1) which are set up in accordance with the price count accumulated in the register 72.

When computing a value in the whole number price mode, the two-stage flip-flop 61 selects in sequence (other sequences can be used) the cents and dimes and dollars places in the price entry to be multiplied one at a time by enabling in sequence the AND gates 83—85 and also selects the proper gates in the partial product gating by such enabling in sequence the AND gates 83—85 which have their outputs connected to leads 104—106, respectively. The two-stage flip-flop 62 selects in sequence (other sequences can be used) the hundredths, tenths, units, and tens places in the weight entry to be multiplied one at a time by enabling in sequence the AND gates 87, 88, 90 and 89 and also selects the proper gates in the partial product gating by such enabling in sequence the AND gates 87, 88, 90 and 89 which have their outputs connected to leads 136—139. The outputs of the AND gates 87-—90 partially enable the AND gates 150—153 (the output of AND gate 90 first enabling OR gate 141 which applies its output to the AND gate 151) which are enabled by clock pulses to be counted passing through the AND gate 77. Hence, the outputs of the price entry selection AND gates 83—85 and the outputs of the weight entry selection AND gates 150—153 enable the proper ones of the AND gates 157—168 to steer the clock pulses to the proper ones of the counters 174—179 so that the partial products are accumulated to the full computed value figure.

Taking as an example in which the counter 175 is not preset as described above, in multiplying $1.23 times 22.22 pounds which equals $27.33, as described above the 2 in the hundredths weight place is multiplied times the 3 in the cents place, then times the 2 in the dimes place, and then times the 1 in the dollars place. This causes the output from the hundredths place AND gate 153 and the outputs in sequence on leads 104—106 to first enable AND gate 157, then AND gate 158, and then AND gate 159. The enabled AND gate 157 permits six pulses to be fed to counter 174 (2 in the hundredths weight entry times 3 in the cents place), the enabled AND gate 158 permits four pulses to be fed to counter 175 (2 in the hundredths weight entry times 2 in the dimes place), and the enabled AND gate 159 permits two pulses to be fed to counter 176 (2 in the hundredths weight entry times 1 in the dollars place). Then, the 2 in the tenths weight place is multiplied times the 3 in the cents place, then times the 2 in the dimes place, and then times the 1 in the dollars place. This causes the output from the tenths place AND gate 152 and the outputs in sequence on leads 104—106 to enable AND gates 160, 161 and 162 in sequence. The enabled AND gates 160—162 permit six pulses to be fed to counter 175, four pulses to counter 176 and two pulses to counter 177. Similarly, multiplying the 2 in the units weight place times the three places in the price entry and then multiplying the 2 in the tens weight place times the three places in the price entry causes partial products to accumulate the counters 174—179.

In our example wherein $1.23 times 22.22 pounds equals $27.33, the partial products are entered and will accumulate to $27.3306 as shown in the following table:

| Counter 179 | Counter 178 | Counter 177 | Counter 176 | Counter 175 | Counter 174 |
| --- | --- | --- | --- | --- | --- |
| 10.0 | 1.0 | 0.1 | 0.01 | 0.001 | 0.0001 |
|  |  |  | 2 pulses | 4 pulses | 6 pulses |
|  |  | 2 pulses | 4 pulses | 6 pulses |  |
|  | 2 pulses | 4 pulses | 6 pulses |  |  |
| 2 pulses | 4 pulses | 6 pulses |  |  |  |
| $2 | 7. | 3 | 3 | 0 | 6 |

The controls of the invention are incorporated in the system to provide fractional pricing so that, for example, a price of 3 pounds/$1.00 can be printed on the tickets, labels or the like and multiplied by weight, the computed value incorporating the fractional price also being printed on the tickets. Fractional prices or whole number prices are entered into the system through the same price entry circuit (FIGS. 2 and 3), the existing computer and programmer circuitry being modified and used for either fractional price or whole number price mode of operation. The system has been described in connection with an example of entering a decimal price such as $1.12 in the price contacts 101—103 and multiplying such unit price by one to store the unit price figure in the register 72 for print out and then multiplying such unit price by weight to store the computed value figure in the register 72 for print out.

Figure 3:
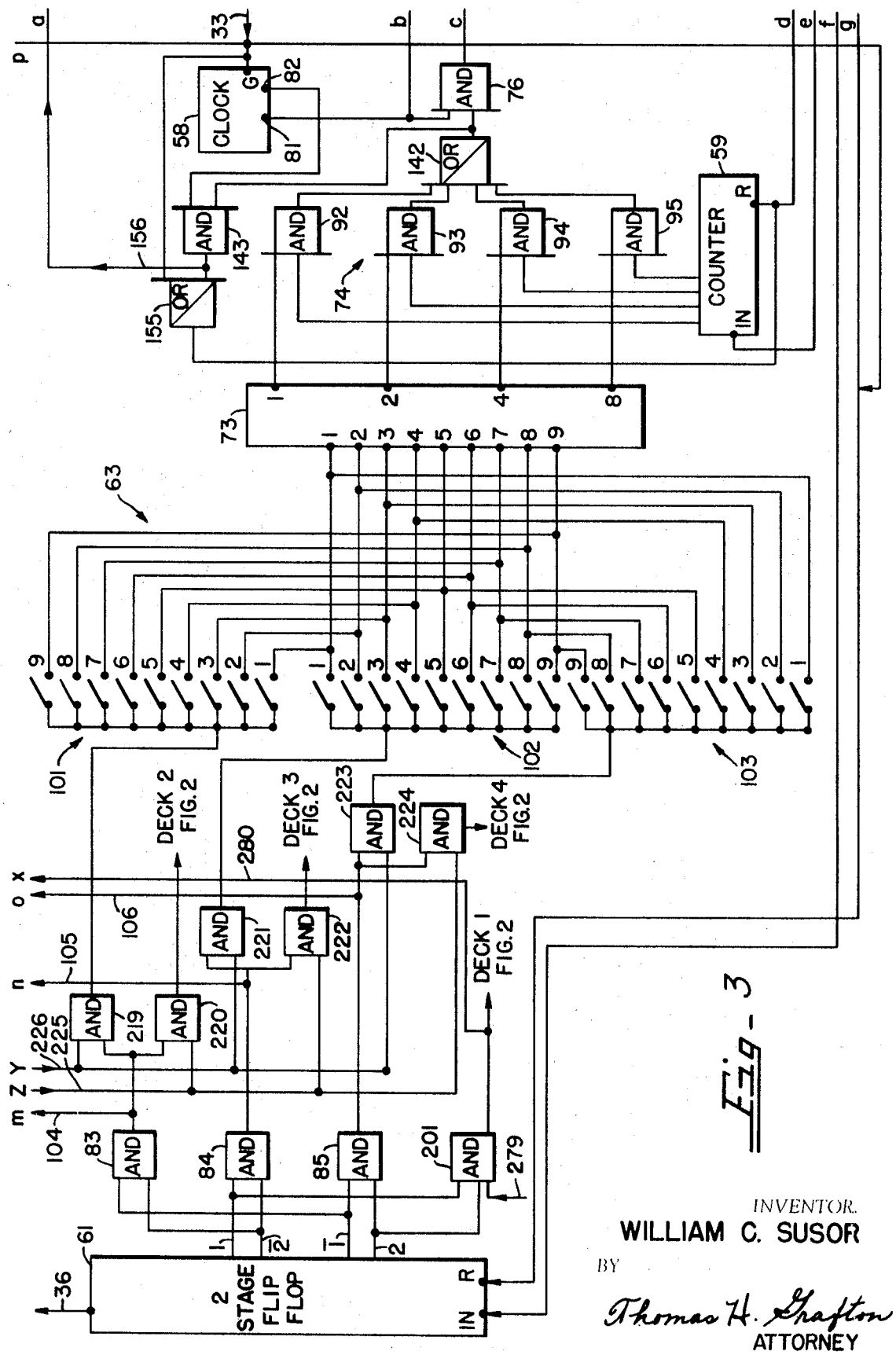

Fractional price entry also is made in the price contacts 101—103 and additionally in a six-deck switch which includes the six decks labeled DECK 1—DECK 6 in FIG. 3. Deck 1 includes a bank of ten 10-dollars contacts (only nine shown); decks 2, 3 and 4 each include a bank of 10 contacts (only nine of each shown); deck 5 includes a bank of two contacts; and deck 6 includes a bank of 10 contacts. The price entry circuit has a capacity of 2/$9.99, 3/$9.99 ..., and 9/$9.99 when in the fractional price mode. As above described, there are a commutator and a print wheel for each set of four output leads from the counters 176—179 in the mechanical readout and printer 39 which are set up in accordance with the computed value count accumulated in the register 72, and there are a commutator and a print wheel for each set of four output leads 42—45 (FIG. 1) which are set up in accordance with the price count accumulated in the register 72 (four sets of output leads and thus four print wheels for price). The print wheel which corresponds to 10-dollars price contacts of deck 1 of switch 218 also prints the slashes, e.g., 3/. The register 72 contains one series of counter stages (not shown) for storing the price figure and another identical series as shown in FIG. 5 for storing the computed value figure. Leads 42—45 extend from the price counter stages (FIG. 1) and leads 54—57 extend from the computed value counter stages. However, the computer circuit can be used exactly as shown with only the one series of counter stages and its gating setting up both the price and computed value print wheels when the multiplexing circuit disclosed in U.S. Pat. application Ser. No. 446,274 filed Apr. 7, 1965 in the name of W. C. Susor is incorporated in the system. When the multiplexing circuit is used, 1-2-4-8 binary coded decimal unit price signals are put on the leads 42—45 (FIG. 1 and also FIG. 1 in the above U.S. Pat. application Ser. No. 446,274) from the register 72 to set up the respective mechanical readout module for unit price printing and thereafter in the program 1-2-4-8 binary coded decimal computed value signals are put on the same leads 42—45 from the same counters in the register 72 to set up the respective mechanical readout module for computed value printing.

The price entry circuit shown in the computer disclosed in the above U.S. Pat. application Ser. No. 439,751 is modified when the fractional pricing controls of the invention are incorporated by the addition of the six-deck switch 218, and AND gate 201, AND gates 219—224, the lead 280, and leads 225—226. Lead 225 is connected to the inputs of the AND gates 220, 222, and 224, and the lead 226 is connected to the inputs of the AND gates 219, 221 and 223. The output of AND gate 83 is connected to the inputs of AND gates 219—220; the output of AND gate 84 is connected to the inputs of AND gates 221—222; the output of AND gate 85 is connected to the inputs of AND gates 223—224; and the output of AND gate 201 is connected to deck 1 of the switch 218 and to the lead 280. The output of AND gate 219 is connected to the bank of 10 cents contacts 101; the output of AND gate 220 is connected to deck 2 of the switch 218; the output of AND gate 221 is connected to the bank of dimes contacts 102; the output of AND gate 222 is connected to deck 3 of the switch 218; the output of AND gate 223 is connected to the bank of dollars contacts 103; and the output of AND gate 224 is connected to deck 4 of the switch 218.

The 1—9 contacts of deck 1 of the switch 218 are in circuit with the respective ones of terminals 1—9 in the diode matrix 73. The 1—9 contacts of deck 1 of switch 218 also are in circuit with certain of the contacts in decks 2, 3 and 4 of the switch 218 in the pattern shown in FIG. 2. The pattern is chosen to change nondecimal fractions to decimal entries in decks 2, 3 and 4. A price of 2 for some-amount-of-money is set by closing contacts 2 of the six-deck switch 218; contacts 2 in decks 2 and 3 are connected to nothing but contact 2 in deck 4 is connected to the 5 terminal in the diode matrix 73 to change the price to a decimal entry of 5.00, e.g., 2 pounds/$1.00 is a price of ½ of $1.00 per pound or 0.5 of $1.00 per pound. The 5.00 decimal entry is changed to a 0.50 in the register 72 as hereinafter described. A price of 3 for ... is set by closing contacts 3; the three 3 contacts in decks 2, 3 and 4 are connected to the 3 terminal in the diode matrix 73 to change the price to a decimal entry of 3.33. A price of 4 for ... is set by closing contacts 4; the 4 contact of deck 2 is connected to nothing, the 4 contact of deck 3 is connected to the 5 terminal in the diode matrix 73 and the 4 contact of deck 4 is connected to the 2 terminal in the diode matrix 73 to change the price to a decimal entry of 2.50. A price of 5 for ... is set by closing contacts 5; the 5 contacts of decks 2 and 3 are connected to nothing and the 5 contact of deck 4 is connected to the 2 terminal in the diode matrix 73 to change the price to a decimal entry of 2.00. A price of 6 for ... is set by closing the contacts 6; the 6 contacts of decks 2—4 are connected to the 7, 6, and 1 terminals in the diode matrix 73, respectively, to change the price to a decimal entry of 1.67. A price of 7 for ... is set by closing contacts 7; the 7 contacts of decks 2—4 are connected to the 3, 4, and 1 terminals in the diode matrix 73, respectively, to change the price to a decimal entry of 1.43. A price of 8 for ... is set by closing contacts 8; the 8 contacts of decks 2—4 are connected to the 5, 2 and 1 terminals in the diode matrix 73, respectively, to change the price to a decimal entry of 1.25. A price of 9 for ... is set by closing contacts 9; the 9 contacts of decks 2—4 are connected to the 1 terminal in the diode matrix 73 to change the price to a decimal entry of 1.11.

Figure 6:
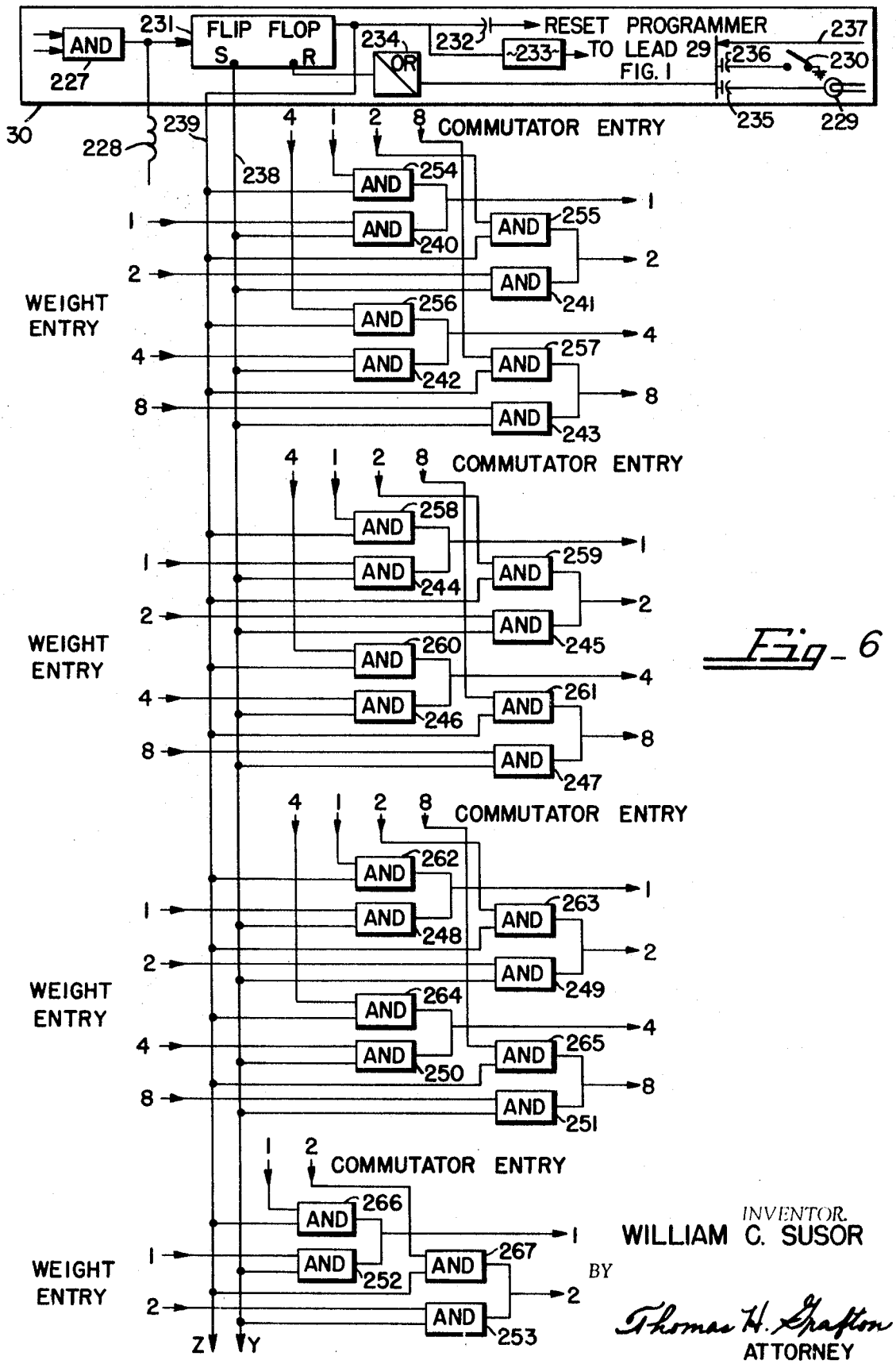
FIG. 6 is a block diagram of part of the controls of the invention combined with the system shown in FIG. 1.

The fractional pricing controls are shown in FIG. 6. The programmer 30 which is shown as a block in FIG. 1 is shown fragmentarily in FIG. 6, the programmer 30 being disclosed in detail in the above application Ser. No. 429,230. Enough of the programmer 30 is shown in FIG. 6 to show how the fractional pricing controls are connected thereto. AND gate 227 and print solenoid coil 228 correspond to AND gate 100 and print solenoid coil 102, respectively, shown in FIG. 3 of application Ser. No. 429,230 and lamp 229 and limit switch 230 correspond, respectively, to lamp 66 and limit switch 103 shown in FIG. 2 of such application. Several additions are made to the programmer when fractional pricing is used. A flip-flop 231, having a set terminal S and a reset terminal R, has its input connected to the output of the AND gate 227 and its output connected, through a capacitor 232, to the reset terminal R of the two-stage flip-flop 55 shown in the above application Ser. No. 429,230 and also has its output connected to the lead 29 (FIG. 1) through a delay circuit 233. Lead 29, as shown in FIG. 1, connects the motion detector 27 to the programmer 30 and, as explained in the above application Ser. No. 429,230, applies no motion signals to the programmer 30. The reset terminal R of the flip-flop 231 is connected to the output of an OR gate 234 which has its input connected, through a capacitor 235, to the lamp 229, through a capacitor 236, to the limit switch 230, and to a lead 237 connected to an output lead 282 of deck 5 of the switch 218. The set terminal S of the flip-flop 231 is connected to a lead 238 and the output of the flip-flop 231 is connected to a lead 239. Lead 238 is connected to the inputs of AND gates 240—253. Lead 239 is connected to the inputs of AND gates 254—267. Lead 238 also is connected to lead 226 (FIG. 2) and to leads 268—273 (FIG. 5). Lead 239 also is connected to lead 225 (FIG. 2) and to leads 274—278 and 281 (FIG. 5).

As above described, there are a commutator and a print wheel for each set of four output leads from the counters 176—179 in the mechanical readout and printer 39 which are set up in accordance with the computed value count accumulated in the register 72. The hundredths-place computed value commutator places its 1-2-4-8 binary coded decimal output on the inputs of AND gates 254—257, respectively, as shown in FIG. 6; the tenths-place computed value commutator places its 1-2-4-8 binary coded decimal output on the inputs of AND gates 258—261, respectively; the units-place computed value commutator places its 1-2-4-8 binary coded decimal output on the inputs of AND gates 262—265, respectively; and the tens-place computed value commutator places the 1-2 part of its 1-2-4-8 binary coded decimal output on the inputs of AND gates 266—267, respectively. Weight entry is made by applying the hundredths-place 1-2-4-8 binary coded decimal output of the electrical readout 19 (FIG. 1) to the inputs of AND gates 240—243, respectively, as shown in FIG. 6; by applying the tenths-place 1-2-4-8 binary coded decimal output of the electrical readout 19 to the inputs of AND gates 244—247, respectively; by applying the units-place 1-2-4-8 binary coded decimal output of the electrical readout 19 to the inputs of AND gates 248—251, respectively; and by applying the 1-2 part of the tens-place 1-2-4-8 binary coded decimal output of the electrical readout 19 to the inputs of AND gates 252—253, respectively. The AND gates, shown in FIG. 6, when enabled produce the indicated binary coded decimal outputs which are applied as weight entries in the weight circuit 64 (FIG. 4) described above. In other words, the computer disclosed in the above U.S. Pat. application Ser. No. 439,751 is modified by connecting the respective leads identified as 1-2-4-8 in FIG. 6 to the weight input leads identified as 1-2-4-8 in FIG. 4.

In operation in whole number price mode, the six-deck switch 218 is set up at 0 or 1 (1 pound for ...) and the price entry is made in the banks of contacts 101—103 as described above. Setting the six-deck switch 218 at 0 or 1 closes the respective 0 or 1 contact in deck 5 putting a DC lock signal on the lead 282 (FIG. 2) which is connected to the lead 237 (FIG. 6) putting in turn the lock signal through the OR gate 234 on the reset terminal R of the flip-flop 231 to set the flip-flop 231. The flip-flop 231 in its set state applies a Y signal to the lead 238 which is applied in turn to the several AND gates that are shown in FIG. 6 connected to the lead 238, to the lead 226 in FIG. 3 also identified as Y, and to the leads 268—273 in FIG. 5 also identified as Y. The flip-flop 231 also is set by a signal spike from the capacitor 236 when the limit switch 230 (corresponds to limit switch 103 in FIG. 2 of application Ser. No. 429,230) is closed at the end of a printing cycle and by a signal spike from the capacitor 235 when the lamp 229 (corresponds to lamp 66 in FIG. 2 of application Ser. No. 429,230) is lit as a signal to the operator to set the commodity name plate in the machine, turn the price knobs or set the price levers, set tare into the system, and push a lock or reset button. Change in a price or tare or commodity plate setting interrupts the cycle of operations and, similarly, movement of deck 6 of the six-deck switch 218 (FIG. 2) interrupts the cycle of operations because the output lead of deck 6 is in series with the switches in the programmer 30 which are operated when new tare and commodity name settings are made. Deck 6 is an interlock which causes the programmer 30 to reset whenever the six-deck switch 218 is turned from one number position to another.

The Y signal on the lead 238 partially enables AND gates 240—253 (FIG. 6) which are enabled by the weight entry to produce the indicated binary coded decimal outputs corresponding exactly to the weight entry, such outputs being applied as weight entries in the circuit 64 (FIG. 4). The Y signal applied to the AND gates 219, 221, and 223 (FIG. 3) partially enables them and when they are enabled by outputs from the two-stage flip-flop controlled AND gates 83—85 such AND gates 219, 221, and 223 apply their outputs to the respective banks of contacts 101—103. Hence, in whole number price mode, price entry is made in the normal way. The Y signal applied to the leads 268—273 (FIG. 5) partially enable the respective AND gates 208, 207, 206, 205, 204 and 203 to which they are connected and the register 72 accumulates the partial products as described above.

To summarize the operation in whole number price mode, the six-deck switch 218 is set at 0 or 1 and the price entry is made in the banks of contacts 101—103. The resulting Y signal produced by the set flip-flop 231 on the lead 238 then produces normal operation, i.e., it allows the price entry to be multiplied by 1 to store the unit price figure in the register 72 for print out as described above and the price entry subsequently to be multiplied by weight to store the computed value figure in the register 72 for print out.

In operation in fractional price mode, the six-deck switch 218 is set at 2 or 3 ... or 9 in accordance with the fractional price, i.e., 2 for ... or 3 for ... or 9 for ... and the rest of the price entry is made in the banks of contacts 101—103. For example, the price of 3/$0.89 is entered by turning the six-deck switch 218 to 3 and by entering 0.89 by closing the 0 contact (not shown) in the dollars contacts 103, by closing the 8 contact in the dimes contacts 102, and by closing the 9 contact in the cents contacts 101. Setting the six-deck switch 218 at a number other than 0 or 1 opens the 0 and 1 contacts of deck 5 of the switch 218 to remove the DC lock signal from the lead 237 (FIG. 6) permitting the set flip-flop 231 to be reset as hereinafter described (DC lock signal on lead 237 or closing of print complete switch 230 or lighting of lamp 229 sets the flip-flop 231 as described above). At this time the programmer 30 is reset by movement of interlock deck 6 of the switch 218 as described above.

Since multiplying one times fractional price is done in the same manner as multiplying one times whole number price, the process will not be described in detail. The Y signal produced by the set flip-flop 231 is applied to the AND gates 219, 221 and 223 and when they are enabled by outputs from the two-stage flip-flop controlled AND gates 83—85 such AND gates 219, 221, and 223 apply their outputs to the respective banks of contacts 101—103. The command from the programmer 30 to multiply one times price is applied to the computer from the lead 35 (FIG. 4) and also is applied to the AND gate 201 from the lead 279 (FIG. 3) and, when the AND gate 201 is enabled by the 1 and 2 outputs from the two-stage flip-flop 61, the AND gate 201 applies its output to deck 1 (10 dollars contacts) of the six-deck switch 218. The Y signal also is applied to the AND gates 268—273 (FIG. 5) to control the partial product gating in the same manner as when in the whole number price mode as described above. In addition, the signal from the enabled AND gate 201 is applied to a lead 280 (FIG. 3) which continues on in FIG. 5 to connect with the input of the AND gate 216.

The function of the AND gate 91 (FIG. 4) is to make entry of a factor of one which is multiplied by the price entry, whether fractional price or whole number price, for the purpose of storing price information in the register 72 (FIG. 5). The AND gate 91 is partially enabled during the multiplying cycle by the two-stage flip-flop 62 and is completely enabled by the command to multiply one times price on the lead 35. The output of the enabled AND gate 91 is applied to the OR gate 141 through the lead 140. The output of the OR gate 141 is applied as an input to the AND gate 151 (FIG. 5) which is completely enabled by clock pulses to be counted passing through the AND gate 77. The output of the AND gate 151 is applied as an input to the AND gate 216 which is completely enabled by a signal on the lead 280 from the AND gate 201 (FIG. 3) indicating that the 10 dollars place in the fractional price entry is being multiplied by one. The output of the AND gate 216 is applied as an input to the OR gate 209 which has its output connected to an input of the OR gate 184 through the AND gate 208 which is partially enabled by the Y signal. The clock pulses (10 dollar price entry on deck 1 of switch 218 times one ) pass through the open gates 151, 216, 209, 208, and 184 into the counter 179. A fractional price entry of 3/0.89, for example, puts nine pulses in counter 176, eight pulses in counter 177, zero pulses in counter 178 in exactly the same manner (because of the Y signal) as when a price entry of 0.89 is multiplied by one when in whole number price mode and in addition three pulses are put in counter 179 (because when in fractional price mode 10 dollar pulses pass through open gates 151, 216, 209, 208 and 184 into counter 179). As above described, the price printer wheel associated with counter 179 also prints the slash. Accordingly, 3/0.89 will be printed.

In continued operation in fractional price mode, after multiplying one times fractional price has been accomplished and the result stored in the mechanical readout 39 (FIG. 1) and using the above example of a price of 3/0.89 and a weight entry of 15 pounds, 0.89 is multiplied by 15 in the same manner as a price entry of 0.89 is multiplied by 15 pounds when in whole number price mode. The 3 which is entered on deck 1 of six-deck switch 218 is not multiplied because at this point in the programmer cycle the command to multiply by one no longer holds AND gate 201 (FIG. 3) open. The command to multiply price times weight appears on the lead 34 (FIG. 4) from the programmer 30 at this point in the cycle. The Y signal produced by the set flip-flop 231 is applied to the AND gates 219, 221 and 223 and when they are enabled by outputs from the two-stage flip-flop controlled AND gates 83—85 such AND gates 219, 221, and 223 apply their outputs to the respective banks of contacts 101—103 in which the price of 0.89 is entered. The Y signal also is applied to the AND gates 268—273 (FIG. 5) to control the partial product gating in the same manner as when in the whole number price mode. Counters 174—179 accumulate the 0.0001, 0.001, 0.01, 0.1, 1.0, and 10.0 decimal places in the product of 0.89 times 15. Counter 175 can be preset with five counts in order to round off to the next higher cent. In multiplying 0.89 times 15 which equals $13.35 (Counter 175 not preset in our example), partial products are accumulated in the same manner as in the above table showing $1.23 multiplied by 22.22 pounds equals $27.33, and counter 179 has one count, counter 178 has three counts, counter 177 has three counts and counter 176 has five counts, i.e., $13.35 is stored in counters 176—179 and subsequently stored in the mechanical readout 39. The programmer AND gate 227 (FIG. 6) then is enabled and applies an input signal to the print solenoid 228 and to the flip-flop 231. However, the controls of the invention prevent this first print signal from causing printing.

The first print signal resets the flip-flop 231 which produces a Z signal on the lead 239 and resets the programmer 30 by causing a spike signal on the capacitor 232 to be applied to the reset terminal R of the two-stage flip-flop 55 shown in the programmer disclosed in the above application Ser. No. 429,230. The programmer 30 resets before the print solenoid 228 has time to produce a print. After a delay produced by delay circuit 233 a signal is placed by the delay circuit 233 on the lead 29 which normally carries the no motion signal from the motion detector 27 (FIG. 1) to the programmer 30. This conditions the programmer for renewed operation. The Z signal on the lead 239 partially enables AND gates 254—267 (FIG. 6) some of which are enabled by the $13.35 figure stored in the mechanical readout 39, i.e., the computed value commutators place their 1-2-4-8 binary coded decimal outputs on the inputs identified as COMMUTATOR ENTRY in FIG. 6 and as described above. In other words, the original weight input of 15 pounds applied at WEIGHT ENTRY in FIG. 6 is changed to 13.35 via the computed value commutators and this faked weight entry is applied as a weight entry in the same manner as a real weight entry when in whole number price mode to the weight circuit (FIG. 4). To summarize, when in whole number price mode, a weight entry applies at WEIGHT ENTRY in FIG. 6 appears unchanged, because of the Y signal, at the output leads 1-2-4-8 and this unchanged weight entry is multiplied by whole number price in the normal way. However, when in fractional price mode, a weight entry applied at WEIGHT ENTRY in FIG. 6 appears unchanged, because of the Y signal, at the output leads 1-2-4-8 and this unchanged weight entry is multiplied by only part of the price, e.g., with a price of 3/0.89, the 0.89 part is used, and then because of the Z signal the product of such part of the price times weight appears at the output leads 1-2-4-8 and thus at the weight entry leads 1-2-4-8 in FIG. 4.

To continue with our example of 3/0.89 times 15 pounds, 0.89 has been multiplied by 15 and the product 13.35 has been entered as a weight entry in the weight circuit shown in FIG. 4. The Z signal also is applied through the lead 225 (FIG. 3) to the AND gates 220, 222 and 224 to partially enable them and when they are enabled by outputs from the two-stage flip-flop controlled AND gates 83—85 such AND gates 220, 222, and 224 apply their outputs to the respective banks of contacts in decks 2, 3 and 4 of the six-deck switch 218. As above described, fractions are changed to decimals in decks 2, 3 and 4. In our example, the price of 3 for ... is set by closing contacts 3, the three 3 contacts in decks 2, 3 and 4 being connected to the 3 terminal in the diode matrix 73 to change the number 3 for ..., i.e., ⅓, to a decimal entry of 3.33 (3.33 because decks 2, 3 and 4 are connected to the dollars, dimes and cents contacts 103—101, respectively, which places the decimal point in the wrong place). This price entry of 3.33 is multiplied by the faked weight entry of 13.35 and the decimal place is shifted one place to the left (3 for ... is ⅓ of 1 which equals 0.333 not 3.33).

The decimal place is shifted one place to the left by means of the Z signals indicated in FIG. 5 and the gates to which they are applied. Normally the 10.0 place pulses are passed through Y signal controlled AND gate 208 to counter 179. However, they now are passed through Z signal controlled AND gate 215 to counter 178, i.e., one decimal place to the left. Similarly, Z signal controlled AND gate 214 passes 1.0 place pulses to counter 177, Z signal controlled AND gate 213 passes 0.1 place pulses to counter 176, Z signal controlled AND gate 212, passes 0.01 place pulses to counter 175, Z signal controlled AND gate 211 passes 0.001 place pulses to counter 174, and Z signal controlled AND gate 210 passes 0.0001 place pulses to counter 179 which spills over through OR gate 202 into counter 174. In our example of 13.35 times 0.333 which equals 4.44555, counter 178 is empty because the computed value has no tens place, counter 177 contains four counts, i.e., the units place, counter 176 contains four counts, i.e., the tenths place, etc. That is, in Y signal operation counters 174—179 accumulate the 0.0001, 0.001, 0.01, 0.1, 1.0 and 10.0 decimal places in the computed value, respectively, but in Z signal operation counters 174—179 accumulate the 0.001, 0.01, 0.1, 1.0, 10.0 and 0.0001 decimal places in the computed value, respectively. Accordingly, in our example of 3/0.89 times 15, 0.89 first is multiplied by 15 which equals 13.35 which in turn is multiplied by 0.333 which equals $4.44555 ($4.45 when counter preset to 5). $4.45 then is stored in the mechanical readout 39 as the computed value for print out. The programmer AND gate 227 (FIG. 6) then is enabled for the second time and applies an input signal to the print solenoid and to the flip-flop 231. This second print signal does not change the state of the flip-flop 231 but does cause the print solenoid to make a print. The print complete signal (contacts 230 closed) then sets the flip-flop 231 ready for the next cycle.

One feature of this invention resides in entering fractional prices, such as 3 pounds/$1.00, and whole number prices, such as 59 cents a pound, through the same price entry apparatus. The 3 pounds/$1.00 fractional price is entered by setting the six-deck switch 218 at 3 and the dollars, dimes and cents contacts 103—101 at 1.00. Setting the six-deck switch 218 at 3 sets deck 5 of such switch at 3 which automatically by removing the DC lock signal from lead 237 (FIG. 6) puts the computer in fractional price mode. The 59 cents a pound whole number price is entered by setting the six-deck switch 218 at 0 or 1 and the contacts 103—101 at 0.59. Setting the six-deck switch 218 at 0 or 1 puts the computer in whole number price mode.

Still another feature resides in entering the fractional prices directly without need for using conversion tables. The 1—9 contacts of deck 1 of the six-deck switch 218 are in circuit with the respective ones of terminals 1—9 in the diode matrix 73. The 1—9 contacts of deck 1 of switch 218 also are in circuit with certain of the contacts in decks 2—4 of the switch 218 in the pattern shown in FIG. 2. The pattern is such that fractions are changed to decimals.

It is to be understood that the above description is illustrative of this invention and that various modifications thereof can be utilized without departing from its spirit and scope.

I claim:

1. A computing weighing scale comprising, in combination, an electronic computer for computing the value of a commodity according to its weight factor and a selected price per single weight unit factor in a first mode of operation or according to its weight factor and a selected price per multiple weight units factor in a second mode of operation, price entry means settable to one or the other of said price factors for entering the price factors in the computer and including electrical contacts for selecting the digits of said prices and for selecting said single weight unit or said multiple weight units, and printing means for printing the computed values and the price factors.

2. A computing weighing scale system comprising, in combination, an electronic computer for computing the value of a commodity according to its weight factor and a selected price per single weight unit factor in a first mode of operation or according to its weight factor and a selected price per multiple weight units factor in a second mode of operation, price entry means settable to said price factors for entering the price factors in the system and including price entry switch means commonly used in both modes of operation, the switch means including banks of cents, dimes and dollars electrical contacts for selecting the digits of said prices and electrical switch means for selecting said single weight unit or said multiple weight units, and printing means for printing the computed values and the price factors.

3. A computing weighing scale comprising, in combination, a computer for computing the value of a commodity according to its weight factor and a selected price per single weight unit factor in a first mode of operation or according to its weight factor and a selected price per multiple weight units factor in a second mode of operation, price entry means settable to said price factors for entering the price factors in the computer, and printing means for printing the computer values and the price factors, wherein the price entry means includes means for automatically converting price per multiple weight units entry to price per single weight unit in decimal form.

4. A computing weighing scale comprising, in combination, a computer for computing the value of a commodity according to its weight factor and a selected price per single weight unit factor in a first mode of operation or according to its weight factor and a selected price per multiple weight units factor in a second mode of operation, price entry means settable to said price factors for entering the price factors in the computer, and printing means for printing the computed values and the price factors, wherein the scale has a cycle of operations and interlock means for interrupting said cycle whenever the mode of operation is changed.

5. A computing weighing scale according to claim 3 wherein the computer includes means for multiplying said price per multiple weight units entry by one, whereby said printing means prints said price entry in said price per multiple weight units form, and for multiplying said converted price entry in decimal form by said weight factor, whereby said printing means prints said computed value in the second mode of operation.

6. A computing weighing scale system comprising, in combination, a computer for computing the value of a commodity according to its weight factor and a selected price per single weight unit factor in a first mode of operation or according to its weight factor and a selected price per multiple weight units factor in a second mode of operation, price entry means settable to said price factors for entering the price per weight unit factors in the system, and printing means for printing the computed values and the price per weight unit factors, said price entry means entering each of the price factors in a single entry to be used both in arriving at the corresponding printed computed value and the printed price per single weight unit or price per multiple weight units factors, wherein the price entry means includes means for automatically converting price per multiple weight units entry to price per single weight unit in decimal form.

7. A computing weighing scale system comprising, in combination, a computer for computing the value of a commodity according to its weight factor and a selected price per single weight unit factor in a first mode of operation or according to its weight factor and a selected price per multiple weight units factor in a second mode of operation, price entry means settable to said price factors for entering the price per weight unit factors in the system, and printing means for printing the computed values and the price per weight unit factors, said price entry means entering each of the price factors in a single entry to be used both in arriving at the corresponding printed computed value and the printed price per single weight unit or price per multiple weight units factors, wherein the scale system has a cycle of operations and interlock means for interrupting said cycle whenever the mode of operation is changed.

8. A computing weighing scale system according to claim 6 wherein the price entry means includes means for storing said price per multiple weight units entry to be multiplied by one and said means for converting the price per multiple weight units entry to decimal form stores said decimal form entry to be multiplied by the weight factor.

9. A computing weighing scale comprising, in combination, a computer for computing the value of a commodity according to its weight and price per weight unit, and price entering means for entering both decimal price per weight unit and nondecimal fraction of decimal price per weight unit factors in the computer, wherein the price entering means includes means for converting the nondecimal fraction to another form.

10. A computing weighing scale comprising, in combination, a computer for computing the value of a commodity according to its weight and price per weight unit, and price entering means for entering both decimal price per weight unit and nondecimal fraction of decimal price per weight unit factors in the computer, wherein the price entering means includes means for storing the nondecimal fraction to be multiplied by one and for storing the nondecimal fraction to be multiplied by the product of weight times the decimal portion of the nondecimal fraction of decimal price per weight unit factor.

11. A computing weighing scale comprising, in combination, a computer for computing the value of a commodity according to its weight and price per weight unit, and price entering means for entering both decimal price per weight unit and nondecimal fraction of decimal price per weight unit factors in the computer, wherein the computer includes means for multiplying weight times the decimal portion of the nondecimal fraction of decimal price per weight unit resulting in a product and for then multiplying said product times said nondecimal fraction resulting in the computed value.

12. A computing weighing scale according to claim 11 wherein the computer further includes means for multiplying the nondecimal fraction of decimal price per weight unit factor by one.

PO-1050
(5/69)

UNITED STATES PATENT OFFICE
CERTIFICATE OF CORRECTION

Patent No. 3,587,759      Dated June 28, 1971

Inventor(s) William C. Susor

It is certified that error appears in the above-identified patent and that said Letters Patent are hereby corrected as shown below:

Column 1, line 5, before "invention" insert --This--.
Column 3, line 4, "1-2-a'-8" should read --1-2-4-8--.
Column 4, lines 13 and 53, "1-2-a'-8" should read --1-2-4-8--;
line 71, "and" second occurrence should read --the--.
Column 5, line 12, "1-2-a'-8" should read --1-2-4-8--; line 33,
"AnD" second occurrence should read --AND--.
Column 7, line 38, "1-2-a'-8" should read --1-2-4-8--.
Column 10, line 23, "0.0001 + 0.001 + 0.01 ++ 1.0 + 10.0"
should read --0.0001 + 0.001 + 0.01 + 0.1 + 1.0 + 10.0--.
Column 12, line 13, "and" should read --the--.
Column 13, line 64, delete "up".

Signed and sealed this 28th day of December 1971.

(SEAL)
Attest:

EDWARD M. FLETCHER, JR.      ROBERT GOTTSCHALK
Attesting Officer      Acting Commissioner of Patents